(12) United States Patent
Mori

(10) Patent No.: US 12,461,567 B2
(45) Date of Patent: Nov. 4, 2025

(54) ELECTRONIC DEVICE

(71) Applicant: Panasonic Intellectual Property Management Co., Ltd., Osaka (JP)

(72) Inventor: Takeshi Mori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 77 days.

(21) Appl. No.: 18/228,076

(22) Filed: Jul. 31, 2023

(65) Prior Publication Data

US 2023/0376080 A1 Nov. 23, 2023

Related U.S. Application Data

(63) Continuation of application No. PCT/JP2022/002316, filed on Jan. 24, 2022.

(30) Foreign Application Priority Data

Feb. 26, 2021 (JP) .................................. 2021-029415

(51) Int. Cl.
*G06F 1/16* (2006.01)
*F16B 21/04* (2006.01)
(Continued)

(52) U.S. Cl.
CPC .......... *G06F 1/1669* (2013.01); *G06F 1/1632* (2013.01); *G06F 1/1643* (2013.01);
(Continued)

(58) Field of Classification Search
CPC .... G06F 1/1669; G06F 1/1643; G06F 1/1666; G06F 1/1679; G06F 1/163; G06F 1/1616;
(Continued)

(56) References Cited

U.S. PATENT DOCUMENTS 4,659,159 A * 4/1987 Takahashi ............ H05K 5/0204
439/571
5,182,698 A * 1/1993 Kobayashi ............ G06F 1/1632
345/905
(Continued)

FOREIGN PATENT DOCUMENTS

JP      2016-081130 A     5/2016
JP      2017123100 A * 7/2017
(Continued)

OTHER PUBLICATIONS

International Search Report for related Application No. PCT/JP2022/002316, mailed Mar. 8, 2022.

*Primary Examiner* — Rockshana D Chowdhury
*Assistant Examiner* — Martin Antonio Asmat Uceda
(74) *Attorney, Agent, or Firm* — Renner, Otto, Boisselle & Sklar, LLP

(57) ABSTRACT

An electronic device includes a first connector that is provided in a first unit, a socket that is provided in a second unit, the first unit being attached and detached to the socket, a lock mechanism that fixes the first unit to the socket, a second connector that comes into contact with the first connector to be electrically connected, a connector holder that holds the second connector, a connector holder shift mechanism that shifts the connector holder, and a link mechanism that links the lock mechanism and the connector holder shift mechanism, the second connector coming into contact with the first connector after the fixing of the first unit to the socket is completed, and the second connector being separated from the first connector before the fixing of the first unit to the socket is released.

4 Claims, 15 Drawing Sheets

(51) Int. Cl.
   *H01R 31/06* (2006.01)
   *H05K 5/02* (2006.01)
(52) U.S. Cl.
   CPC .......... *G06F 1/1654* (2013.01); *G06F 1/1666* (2013.01); *G06F 1/1679* (2013.01); *H05K 5/02* (2013.01); *F16B 21/04* (2013.01); *H01R 31/06* (2013.01)
(58) Field of Classification Search
   CPC .... G06F 1/1637; G06F 1/1654; G06F 1/1632; G06F 1/1615; G06F 1/1681; H01R 31/06; H05K 5/02; F16B 21/04
   See application file for complete search history.

(56) References Cited

U.S. PATENT DOCUMENTS

| | | | | |
|---|---|---|---|---|
| 5,619,397 | A * | 4/1997 | Honda | G06F 1/1632 439/157 |
| 6,317,315 | B1 * | 11/2001 | Lee | G06F 1/1601 348/836 |
| 6,697,252 | B2 * | 2/2004 | Maeda | G06F 1/1632 248/552 |
| 6,952,344 | B2 * | 10/2005 | Weng | G06F 1/1632 361/679.41 |
| 7,079,384 | B2 * | 7/2006 | Wang | E05B 73/0082 361/679.43 |
| 7,207,848 | B2 * | 4/2007 | Fukatsu | H01R 13/4362 439/157 |
| 7,889,488 | B2 * | 2/2011 | Kumagai | G06F 1/1656 248/346.06 |
| 9,423,833 | B2 * | 8/2016 | Sano | G06F 3/04886 |
| 9,632,536 | B1 * | 4/2017 | Kuo | G06F 1/1632 |
| 9,649,989 | B2 * | 5/2017 | Bernert | G06F 3/02 |
| 9,848,503 | B2 * | 12/2017 | Huang | F16M 11/10 |
| 9,869,423 | B2 * | 1/2018 | Khodapanah | F16M 11/2021 |
| 9,898,043 | B2 * | 2/2018 | Agata | G06F 1/1632 |
| 10,090,617 | B2 * | 10/2018 | Nakatani | G06F 1/1637 |
| 10,185,359 | B2 * | 1/2019 | Nakamura | H04M 1/04 |
| 10,289,165 | B2 * | 5/2019 | Miyamoto | G06F 1/1601 |
| 10,452,103 | B2 * | 10/2019 | Tatsuno | H01R 13/639 |
| 10,760,732 | B1 * | 9/2020 | Koh | F16M 13/02 |
| 11,122,156 | B2 * | 9/2021 | Liu | F16M 11/041 |
| 2002/0030970 | A1 * | 3/2002 | Kim | G06F 1/1632 361/679.43 |
| 2004/0184228 | A1 * | 9/2004 | Minaguchi | G06F 1/1679 361/679.57 |
| 2008/0078062 | A1 * | 4/2008 | Hsu | H04M 1/0212 16/367 |
| 2014/0355210 | A1 * | 12/2014 | Hashimoto | G06F 1/1679 248/346.03 |
| 2017/0285693 | A1 | 10/2017 | Mori et al. | |

FOREIGN PATENT DOCUMENTS

| | | | |
|---|---|---|---|
| JP | 2017-138869 A | 8/2017 | |
| JP | 2017-146698 A | 8/2017 | |
| JP | 6458255 B2 * | 1/2019 | .......... G06F 1/1616 |
| JP | 2019-067437 A | 4/2019 | |
| JP | 2020123144 A * | 8/2020 | |

* cited by examiner

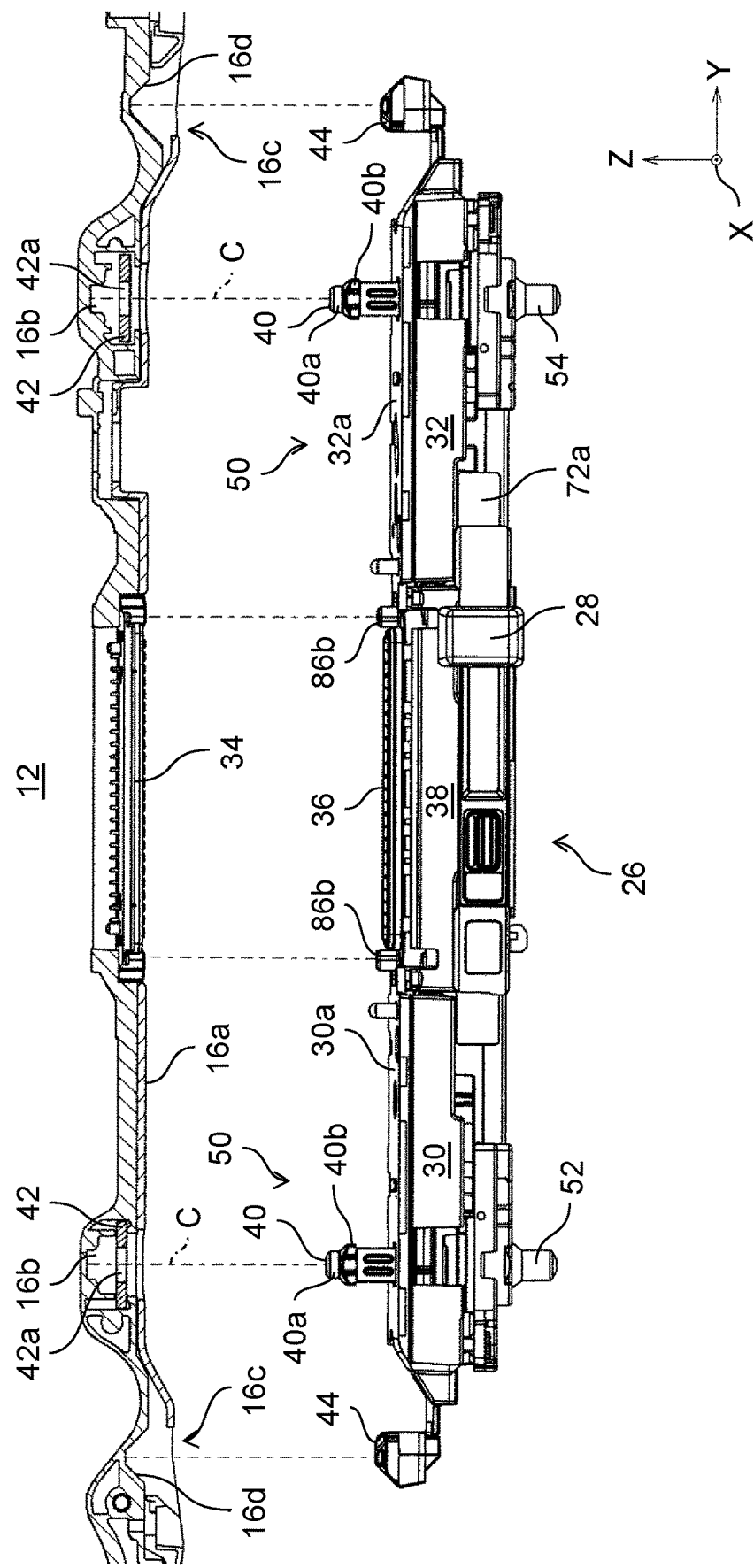

ELECTRONIC DEVICE

BACKGROUND

1. Technical Field

The present disclosure relates to an electronic device.

2. Description of the Related Art

For example, Patent Literature (PTL) 1 discloses an electronic device including a tablet terminal (first unit) including a touch screen and a keyboard unit (second unit) detachably attached to the tablet terminal and including a keyboard. The keyboard unit includes a socket to which the tablet terminal is attached. A connector that comes into contact with a connector of the tablet terminal to be electrically connected is provided in the socket.

PTL 1 is Unexamined Japanese Patent Publication No. 2019-67437.

SUMMARY

Incidentally, in the case of the electronic device described in PTL 1, there is a possibility that the tablet terminal and the keyboard unit are energized before the tablet terminal is completely fixed to the socket. In addition, even though the fixing of the tablet terminal to the socket is released, there is a possibility that the tablet terminal and the keyboard unit are energized until the tablet terminal is removed from the socket.

Therefore, an object of the present disclosure is to establish electrical connection between a first unit and a second unit in a state where the first unit is completely fixed to the second unit in an electronic device including the first unit and the second unit that are detachably attached to each other.

In order to solve the above problem, according to one aspect of the present disclosure, there is provided an electronic device including a first unit and a second unit that are detachably attached to each other. The electronic device includes a first connector that is provided in the first unit, a socket that is provided in the second unit, the first unit being attached and detached to the socket in a first direction, a lock mechanism that fixes the first unit to the socket, a second connector that is provided in the socket, the second connector coming into contact with the first connector in the first direction to be electrically connected, a connector holder that is provided in the socket to be shiftable in the first direction, the connector holder maintaining the second connector, a connector holder shift mechanism that shifts the connector holder in the first direction, and a link mechanism that mechanically links the lock mechanism and the connector holder shift mechanism, the second connector coming into contact with the first connector after the fixing of the first unit to the socket is completed, the second connector is separated from the first connector before the fixing of the first unit to the socket is released.

According to the present disclosure, in the electronic device including the first unit and the second unit that are detachably attached to each other, in a state where the first unit is completely fixed to the second unit, the electrical connection between the first unit and the second unit can be established.

BRIEF DESCRIPTION OF THE DRAWINGS

FIG. 6 is a partial cross-sectional view illustrating the docking unit and a part of the tablet terminal facing each other.

DETAILED DESCRIPTION

Exemplary embodiments will be described below in detail with reference to the drawings as appropriate. However, a detailed description more than necessary may be omitted. For example, the detailed description of already well-known matters and the overlap description of substantially the same configurations may not be described. This is to avoid an unnecessarily redundant description below and to facilitate understanding by those skilled in the art.

Note that, the inventor provides the accompanying drawings and the description below to help those skilled in the art to fully understand the present disclosure, and do not intend to use the accompanying drawings or the description below to limit the subject matter described in the claims.

Figure 1:
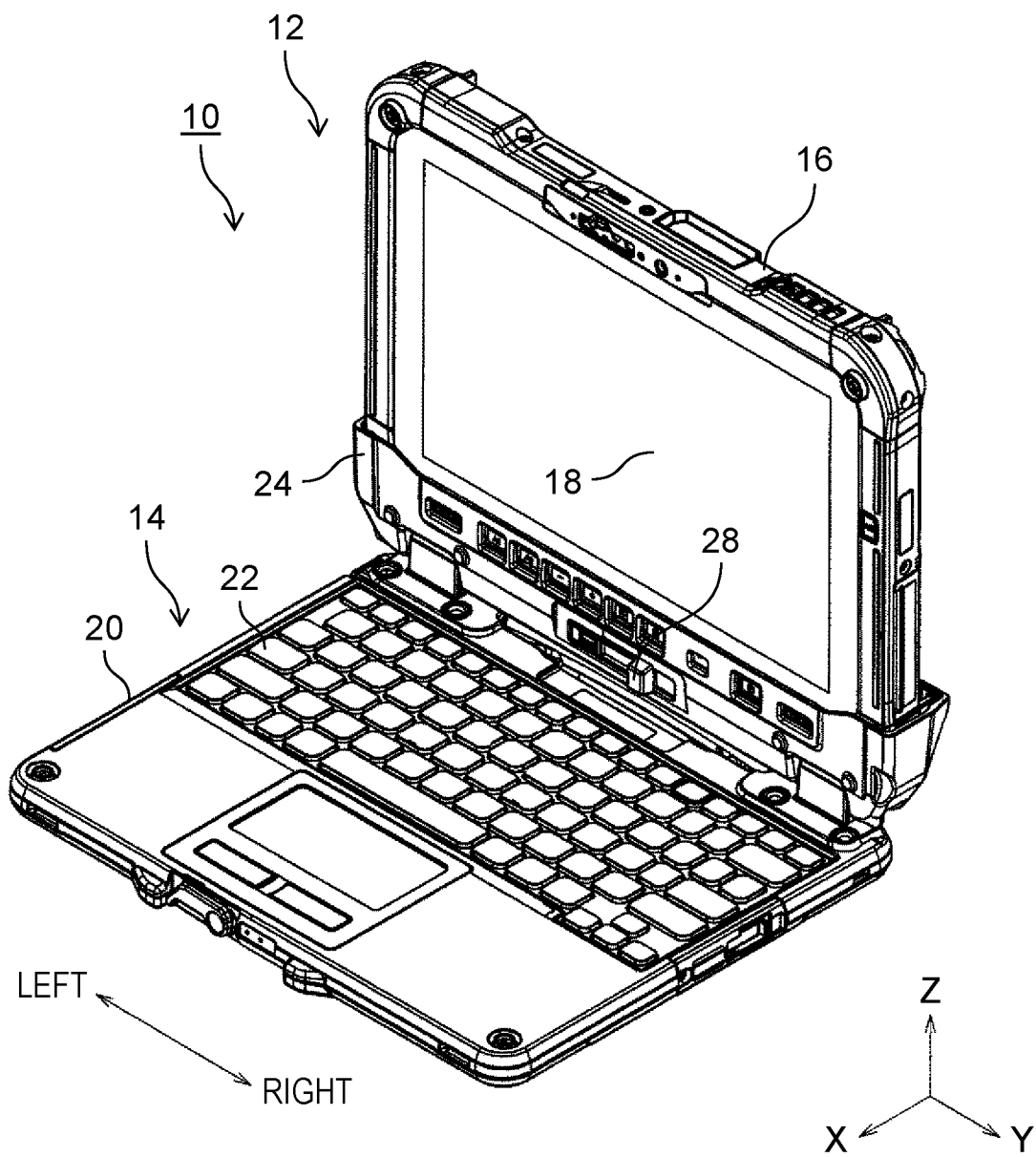
FIG. 1 is a perspective view of a detachable PC which is an example of an electronic device according to an exemplary embodiment of the present disclosure.

FIG. 1 is a perspective view of a detachable PC which is an example of an electronic device according to an exemplary embodiment of the present disclosure.

Note that, an X-Y-Z rectangular coordinate system illustrated in the drawings is for facilitating understanding of the exemplary embodiments of the present disclosure, and does not limit the exemplary embodiments. An X-axis direction indicates a depth direction of the electronic device, a Y-axis direction (second direction) indicates a width direction, and a Z-axis direction (first direction) indicates a height direction.

As illustrated in FIG. 1, so-called detachable PC 10 that is the electronic device includes tablet terminal 12 (first unit) and keyboard unit 14 (second unit) that are detachably attached to each other.

Tablet terminal 12 includes housing 16 and touch screen panel 18 (an example of a touch screen) provided in housing 16. Keyboard unit 14 includes housing 20 and keyboard 22 provided in housing 20.

Socket 24 to and from which tablet terminal 12 is attached and detached is provided in keyboard unit 14. One end of tablet terminal 12 in the height direction (Z-axis direction) is detachably fitted into socket 24.

Figure 2:
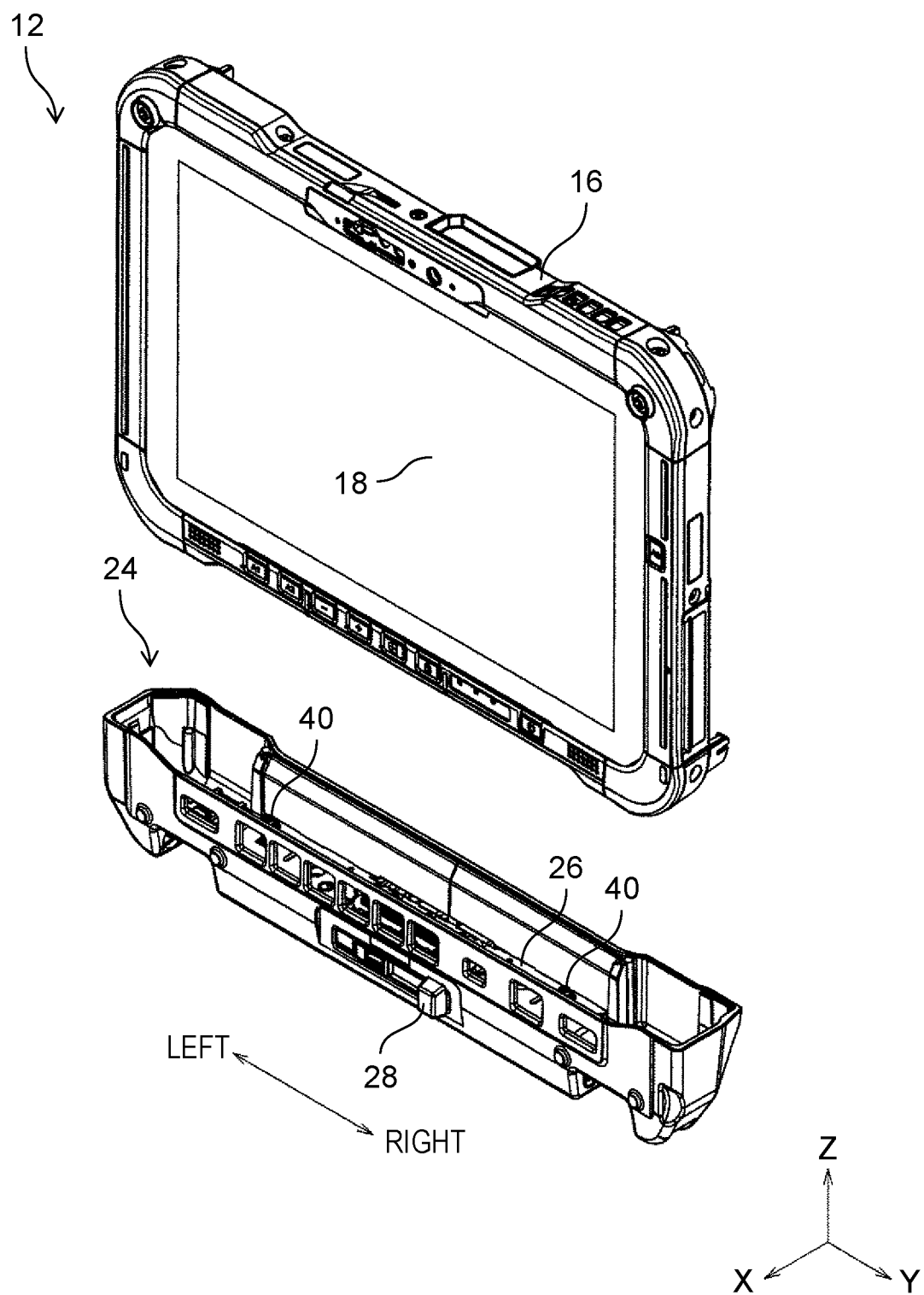
FIG. 2 is a perspective view of a state where a tablet terminal is detached from a socket.

FIG. 2 is a perspective view of a state where the tablet terminal is removed from the socket.

As illustrated in FIG. 2, docking unit 26 that docks with tablet terminal 12 is provided in socket 24. Tablet terminal 12 attached to socket 24 is fixed to socket 24 through this docking unit 26. While details will be described later, tablet terminal 12 is fixed to socket 24 (that is, docking unit 26) and released from the fixed state by a user operating lock knob 28 provided on socket 24 to be movable in the width direction (Y-axis direction).

Figure 3:
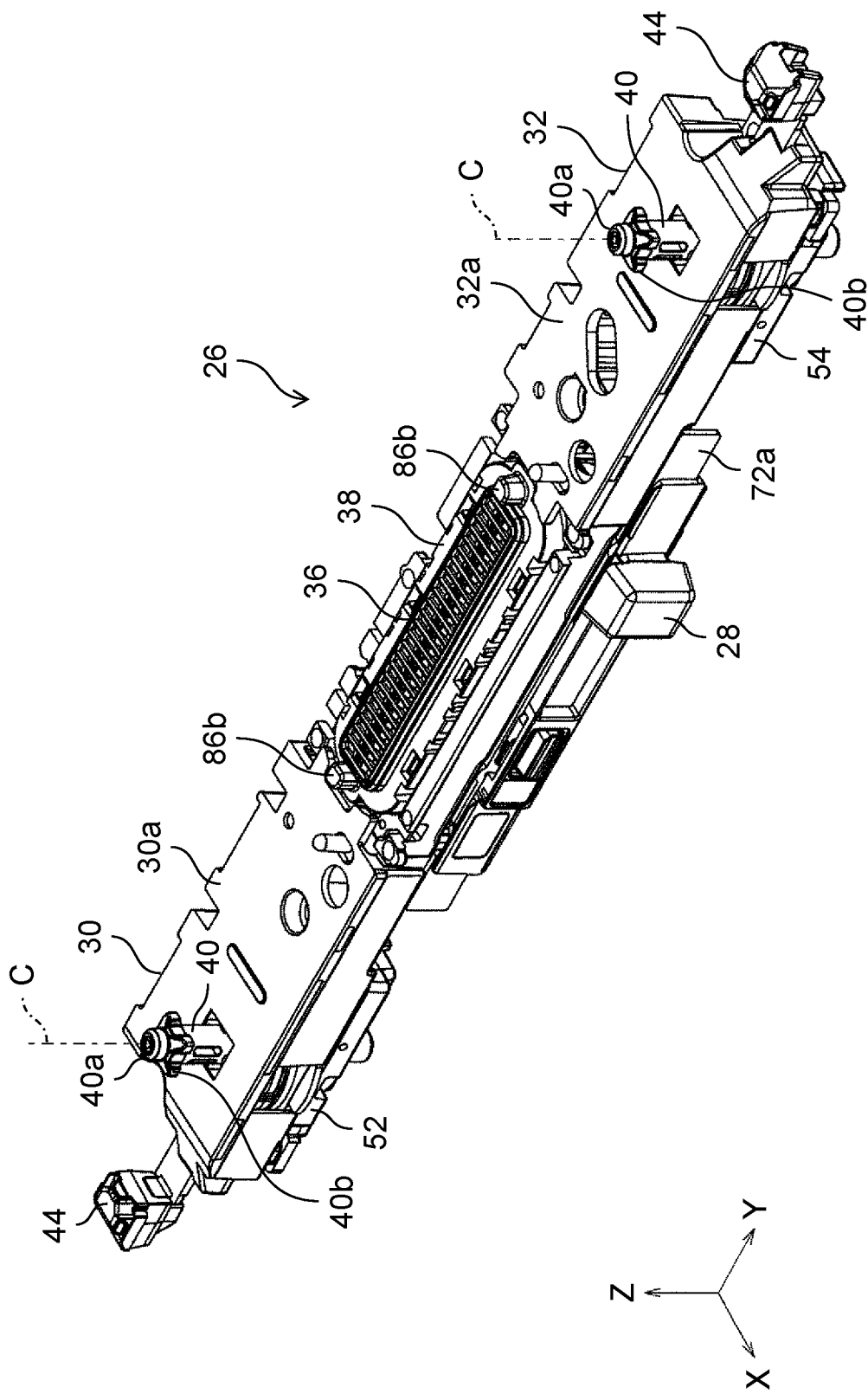
FIG. 3 is a perspective view of a docking unit.

FIG. 3 is a perspective view of the docking unit.

As illustrated in FIG. 3, docking unit 26 includes support members 30 and 32 that support tablet terminal 12 attached to socket 24. Support members 30 and 32 include seating surfaces 30a and 32a on which tablet terminal 12 is seated.

Figure 4:
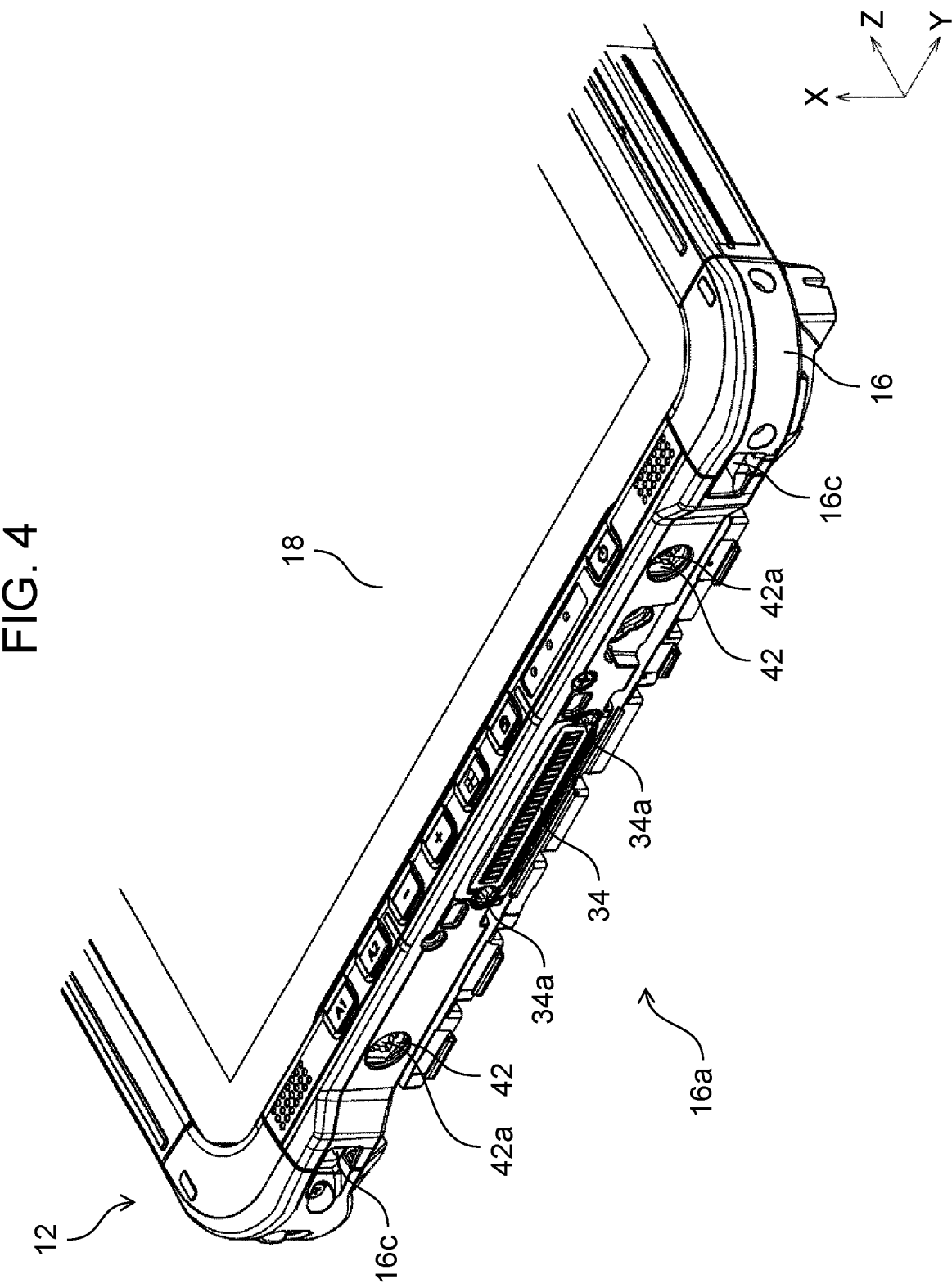
FIG. 4 is a perspective view of the tablet terminal illustrating a docking surface of the tablet terminal docked with the docking unit.
Figure 5:
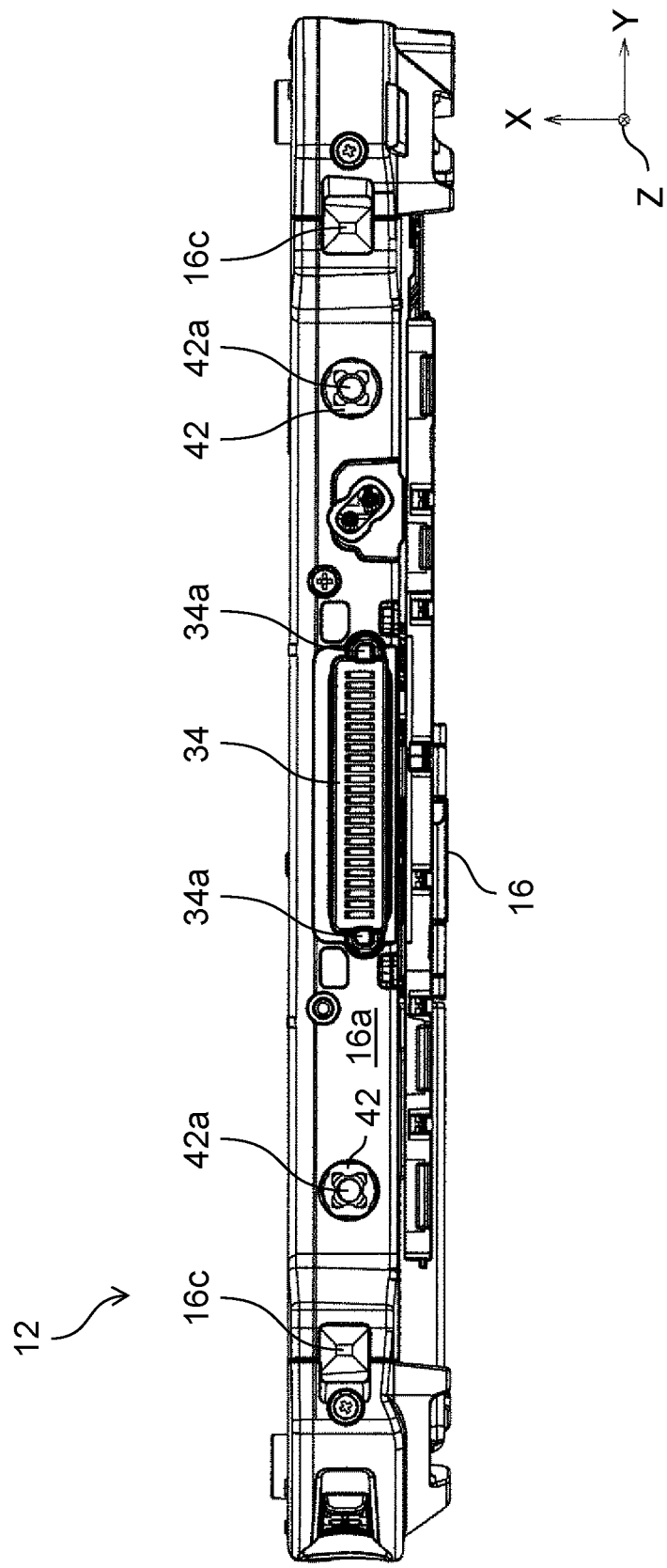
FIG. 5 is a diagram illustrating the docking surface of the tablet terminal.

FIG. 4 is a perspective view of the tablet terminal illustrating a docking surface of the tablet terminal docked with the docking unit. In addition, FIG. 5 is a diagram illustrating the docking surface of the tablet terminal. FIG. 6 is a partial cross-sectional view illustrating the docking unit and a part of the tablet terminal facing each other.

As illustrated in FIGS. 4 and 5, first connector 34 is provided on docking surface 16a which is one end surface of housing 16 of tablet terminal 12 seated on seating surfaces 30a and 32a of support members 30 and 32 of docking unit 26 in the height direction (Z-axis direction). First connector 34 is provided at a central portion of docking surface 16a in the width direction (Y-axis direction).

As illustrated in FIG. 6, second connector 36 that comes into contact with and electrically connected to first connector 34 is provided in docking unit 26 (that is, socket 24). Second connector 36 is provided at a central portion of docking unit 26 in the width direction (Y-axis direction). That is, second connector 36 is disposed between support members 30 and 32. Note that, although details will be described later, second connector 36 is held by connector holder 38 provided in docking unit 26 to be shiftable in the height direction (Z-axis direction).

As illustrated in FIG. 6, tablet terminal 12 approaches docking unit 26 in the height direction (Z-axis direction), that is, tablet terminal 12 is attached to socket 24 in the height direction. Accordingly, first connector 34 comes into contact with second connector 36 in the height direction. Accordingly, first connector 34 and second connector 36 are electrically connected.

To maintain contact, that is, electrical connection between first connector 34 and second connector 36, tablet terminal 12 attached to socket 24 is fixed to docking unit 26 in socket 24. Thus, lock shafts 40 are provided in docking unit 26.

As illustrated in FIGS. 3 and 6, in the case of the present exemplary embodiment, two lock shafts 40 are provided in docking unit 26 with second connector 36 interposed therebetween. Lock shafts 40 extend in the height direction (Z-axis direction). In addition, although described in detail later, lock shafts 40 are provided in docking unit 26 to be rotatable about rotation center line C extending in the height direction and shiftable in the height direction.

Further, lock shaft 40 includes engagement part 40a having a cylindrical shape and provided at a distal end close to tablet terminal 12, and hook part 40b having a non-circular shape and protruding in a direction orthogonal to rotation center line C as viewed in the height direction (as viewed in the Z-axis direction). Hook part 40b has a non-circular shape such as a square shape or a cross shape as viewed in the height direction.

As illustrated in FIG. 6, annular members 42 each having an annular shape are provided, as engagement parts that engage with lock shafts 40, in housing 16 of tablet terminal 12. Annular member 42 includes through-hole 42a through which hook part 40b of lock shaft 40 can pass and which has substantially the same shape (that is, a slightly larger shape) as hook part 40b as viewed in the height direction (Z-axis direction).

Figure 7A:
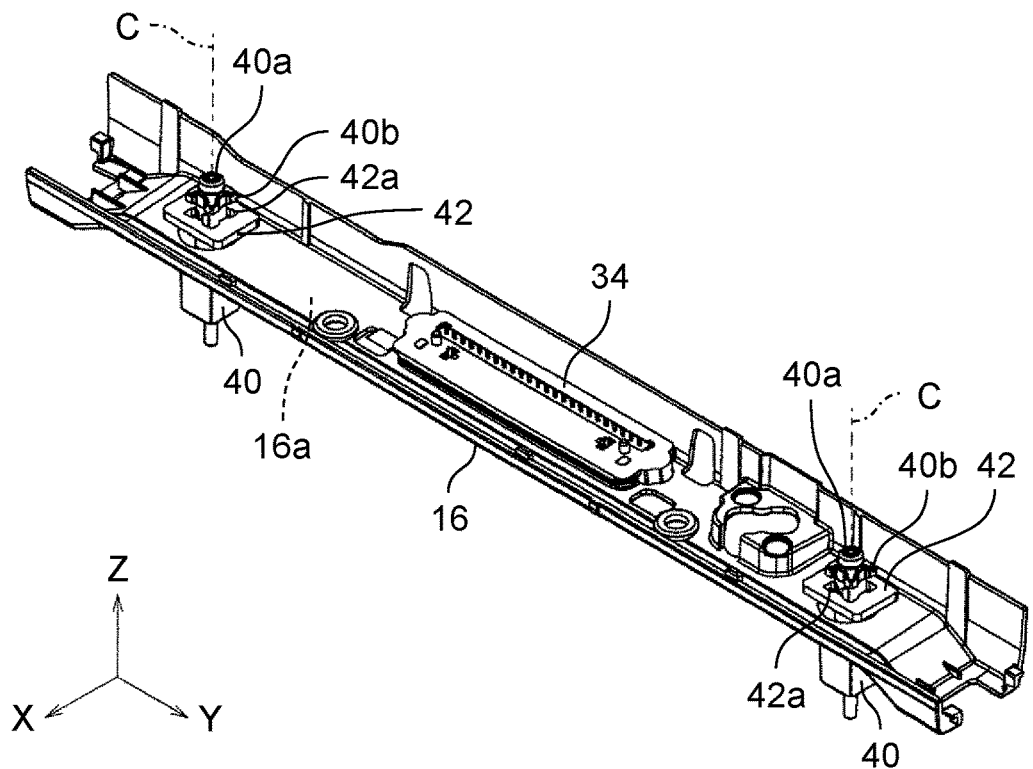
FIG. 7A is a perspective view illustrating a state (unlocked state) where a hook part of a lock shaft passes through a through-hole of an annular member.
Figure 7B:
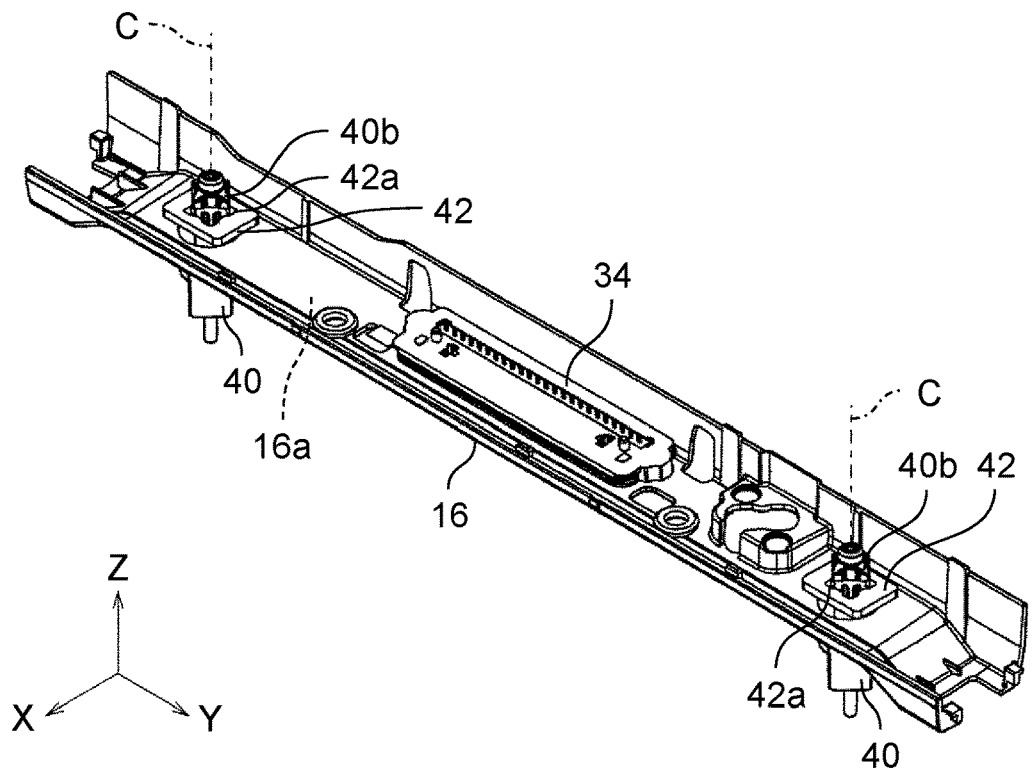
FIG. 7B is a perspective view illustrating a state (half-locked state) after the lock shaft rotates at a predetermined rotation angle.
Figure 7C:
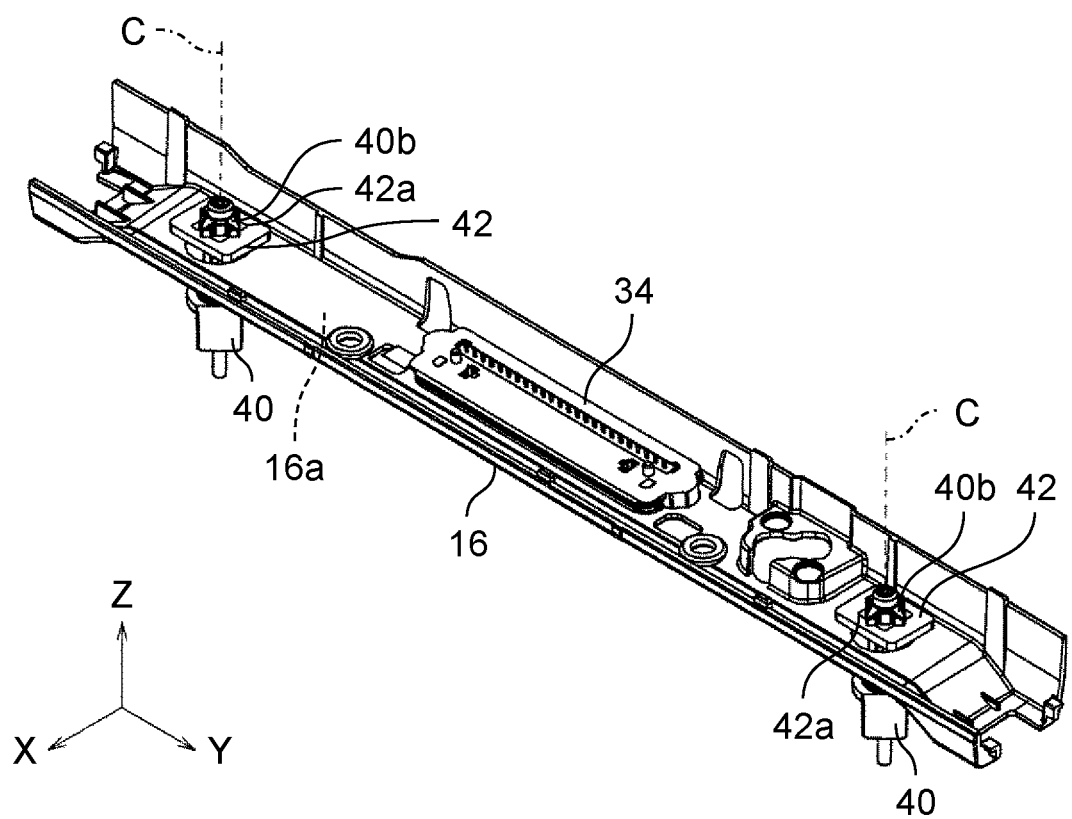
FIG. 7C is a perspective view illustrating a state (locked state) where the hook part of the lock shaft is caught on the annular member.

FIGS. 7A to 7C are perspective views illustrating a flow of engagement between the lock shaft and the annular member. FIG. 7A illustrates a state (unlocked state) where the hook part of the lock shaft passes through the through-hole of the annular member. In addition, FIG. 7B illustrates a state (half-locked state) after the lock shaft rotates at a predetermined rotation angle. FIG. 7C illustrates a state (locked state) where the hook part of the lock shaft is caught by the annular member.

First, as illustrated in FIG. 7A, hook part 40b of lock shaft 40 passes through through-hole 42a of annular member 42. As illustrated in FIG. 6, engagement part 40a of lock shaft 40 rotatably engages with engagement hole 16b provided in housing 16 of tablet terminal 12. Note that, an inner surface of socket 24 guides tablet terminal 12, and thus, lock shaft 40 can easily pass through through-hole 42a of annular member 42.

Subsequently, as illustrated in FIG. 7B, lock shaft 40 in a state where hook part 40b has passed through through-hole 42a of annular member 42 is rotated by a predetermined angle about rotation center line C. In the present exemplary embodiment, since hook part 40b has a square shape as viewed in the height direction (Z-axis direction), the predetermined angle is 45 degrees.

Then, as illustrated in FIG. 7C, hook part 40b of lock shaft 40 in a state of being rotated by the predetermined angle is shifted in the height direction (Z-axis direction) toward seating surfaces 30a and 32a of docking unit 26. Hook part 40b is shifted by, for example, 1 mm. By this shift and rotation of the predetermined angle, hook part 40b of lock shaft 40 is caught by annular member 42 without passing through through-hole 42a of annular member 42. As a result, tablet terminal 12 is pulled into the back of socket 24, and the state where docking surface 16a of tablet terminal 12 comes into contact with seating surfaces 30a and 32a of docking unit 26 is maintained. That is, as illustrated in FIG. 1, a position of tablet terminal 12 in the height direction (Z-axis direction) with respect to socket 24 (that is, docking unit 26 in socket 24) is fixed.

Note that, in the case of the present exemplary embodiment, in order to fix a position of tablet terminal 12 in the depth direction (X-axis direction) with respect to docking unit 26 and a position thereof in the width direction (Y-axis direction), positioning members 44 are provided in docking unit 26 (that is, socket 24) as illustrated in FIG. 6.

Specifically, positioning member 44 is made of an elastically deformable material and has a conical shape or a frusto-conical shape. In the present exemplary embodiment, positioning member 44 has a substantially quadrangular frusto-conical shape as illustrated in FIGS. 3 and 6. Specifically, positioning member 44 includes a pair of inclined surfaces facing an outside in the depth direction (X-axis direction) and a pair of inclined surfaces facing an outside in the width direction (Y-axis direction). In addition, positioning members 44 are provided at both ends of docking unit 26 in the width direction.

As illustrated in FIGS. 4 to 6, positioning holes 16c engaging with positioning members 44 are formed in docking surface 16a of housing 16 of tablet terminal 12. In addition, positioning hole 16c includes inner peripheral surface 16d having a conical surface shape of an inverted cone or a conical surface shape of an inverted frusto-cone. Specifically, inner peripheral surface 16d of positioning hole 16c includes a pair of inclined surfaces facing each other in the depth direction (X-axis direction) and a pair of inclined surfaces facing each other in the width direction (Y-axis direction). In addition, positioning holes 16c are formed at both ends of docking surface 16a of tablet terminal 12 in the width direction.

Positioning members 44 come into contact with inner peripheral surfaces 16d of positioning holes 16c and are elastically deformed. Specifically, as illustrated in FIG. 7C, when the state where docking surface 16a of tablet terminal 12 comes into contact with seating surfaces 30a and 32a of docking unit 26 is maintained by lock shaft 40, positioning members 44 elastically deform to come into close contact with inner peripheral surfaces 16d of positioning holes 16c. Positioning members 44 come into close contact with inner peripheral surfaces 16d of positioning holes 16c, and thus, as illustrated in FIG. 1, the position of tablet terminal 12 in the depth direction (X-axis direction) with respect to socket 24 (that is, docking unit 26 in socket 24) and the position thereof in the width direction (Y-axis direction) are fixed.

Note that, alternatively, the positioning members may be provided in tablet terminal 12, and the positioning holes may be provided in docking unit 26 (that is, the keyboard unit).

Next, as illustrated in FIGS. 7A to 7C, components that rotate lock shaft 40 about rotation center line C and shift the lock shaft 40 in the height direction (Z-axis direction) will be described. That is, a lock mechanism that pulls tablet terminal 12 into the back of socket 24 to maintain contact between tablet terminal 12 and socket 24 (that is, docking unit 26 in socket 24) will be described.

Figure 8A:
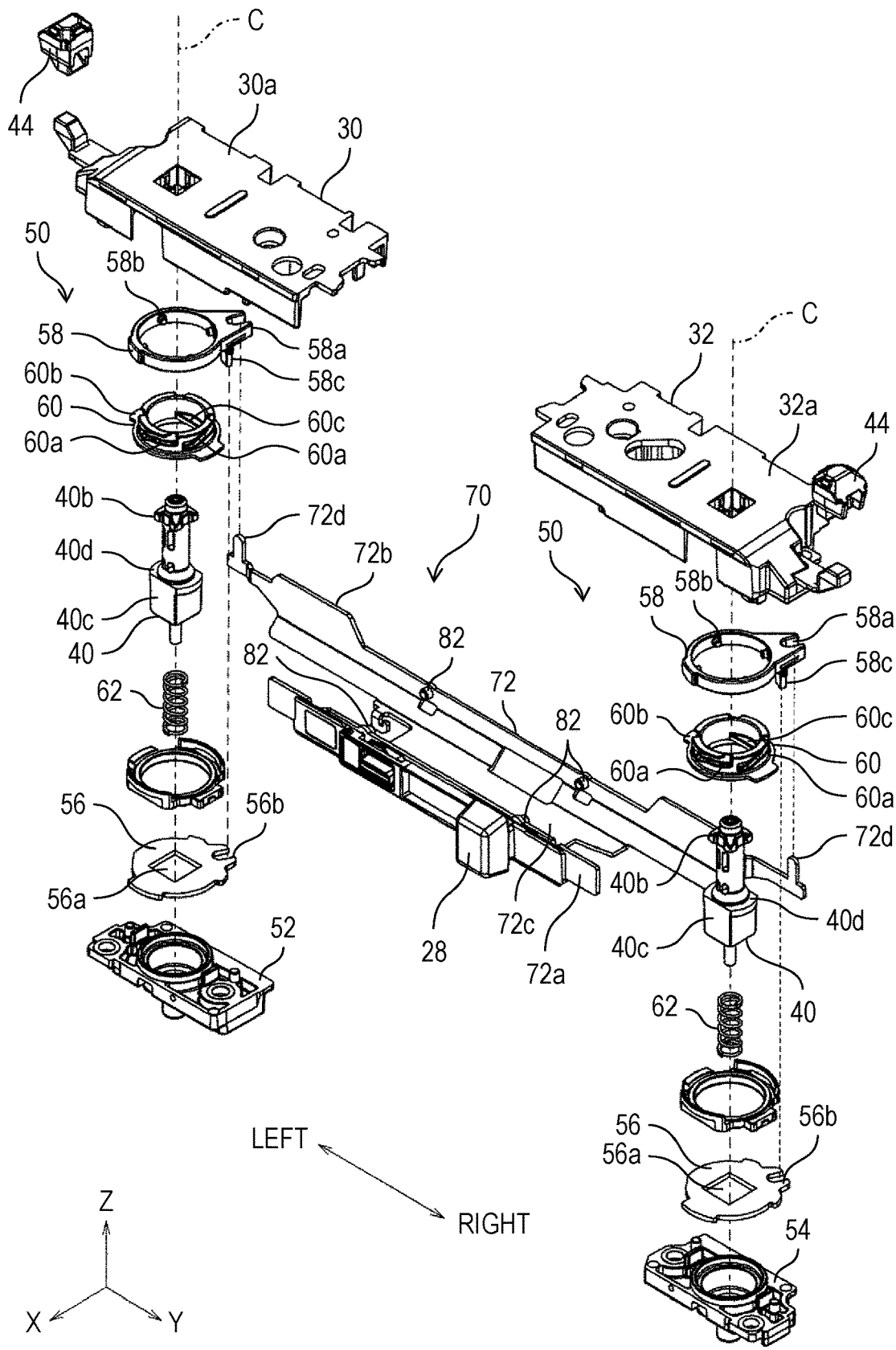
FIG. 8A is an exploded perspective view of a lock mechanism in the unlocked state corresponding to FIG. 7A.
Figure 8B:
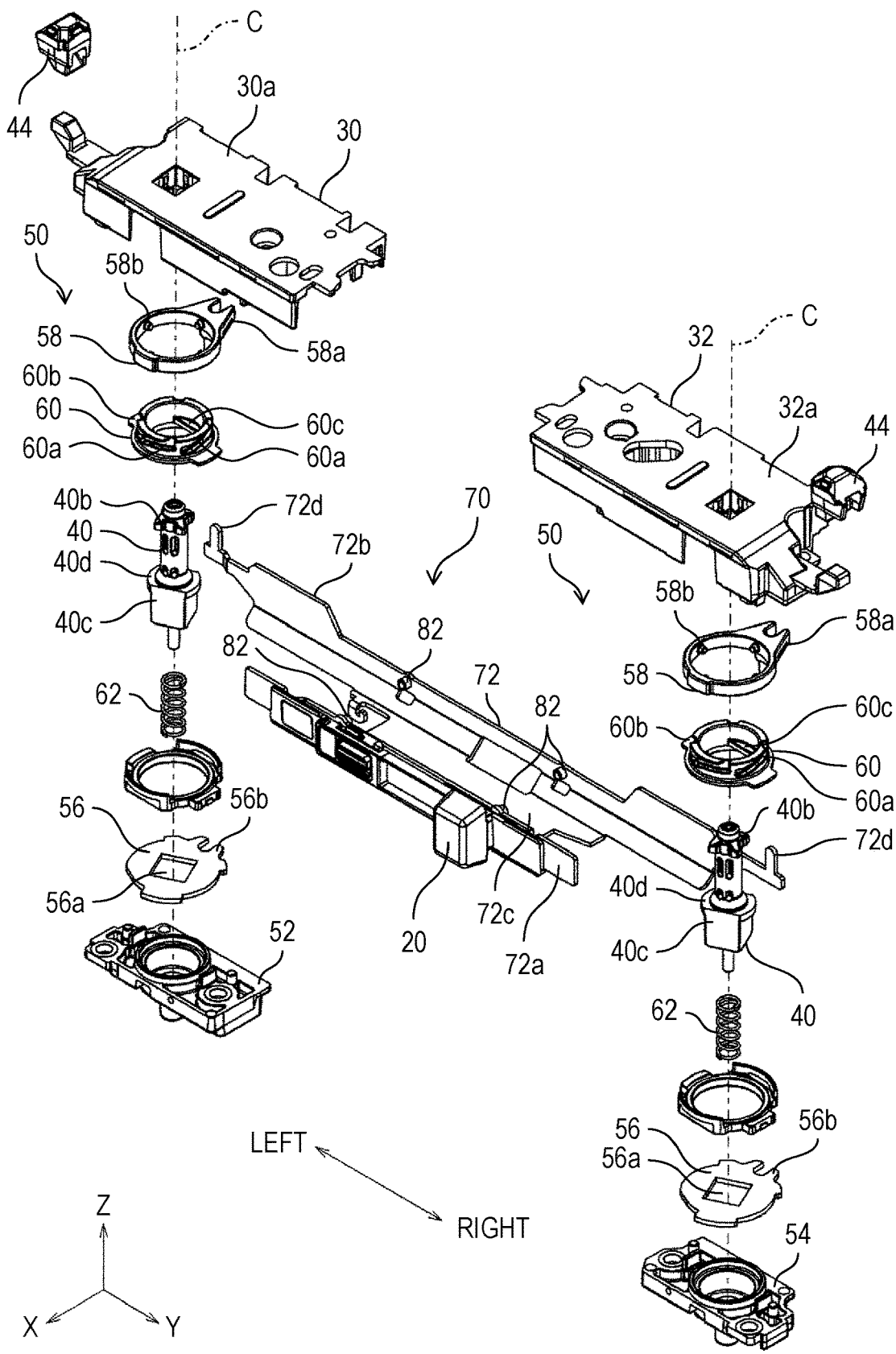
FIG. 8B is an exploded perspective view of the lock mechanism in the half-locked state corresponding to FIG. 7B.
Figure 8C:
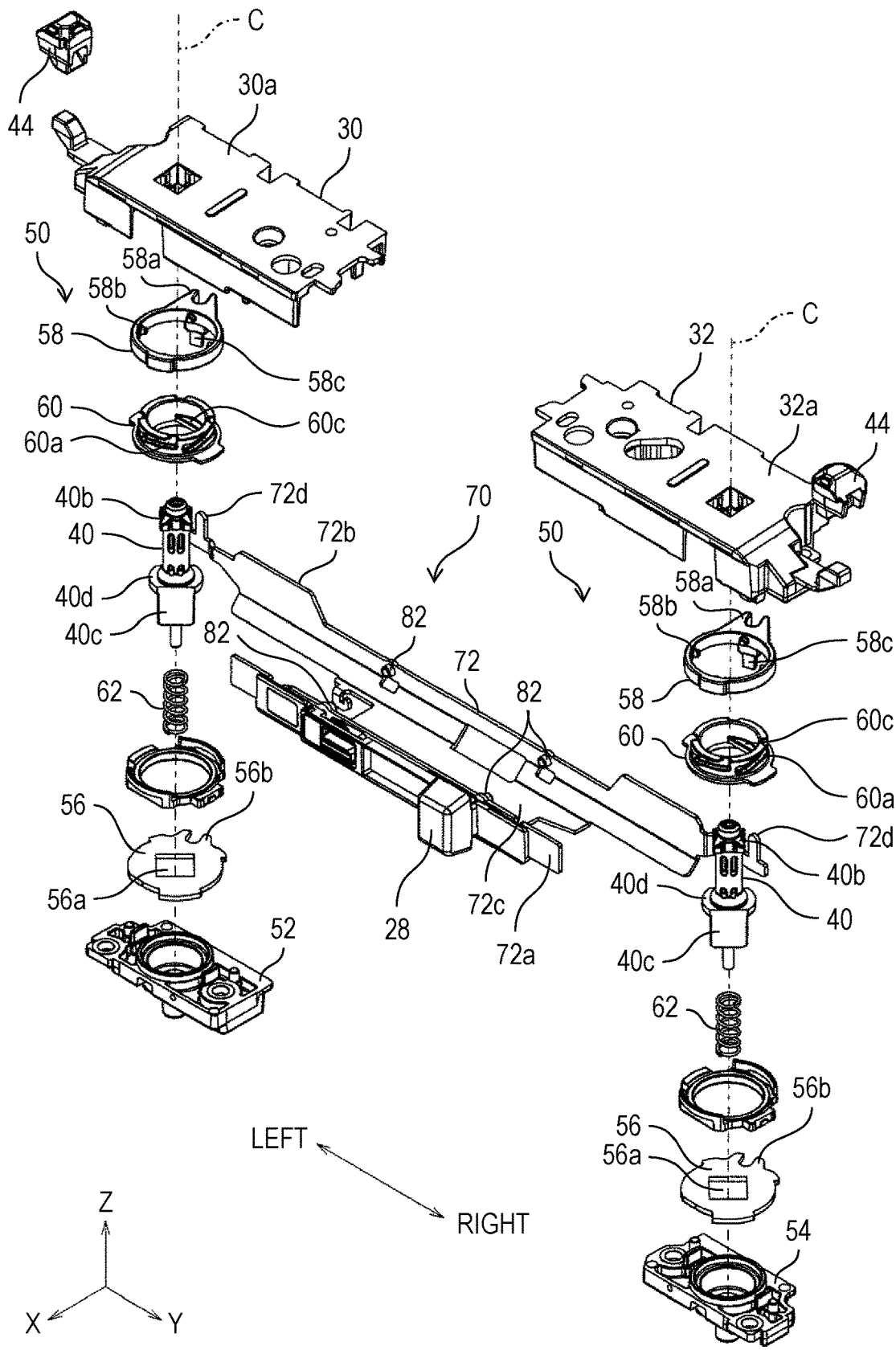
FIG. 8C is an exploded perspective view of the lock mechanism in the locked state corresponding to FIG. 7C.
Figure 9:
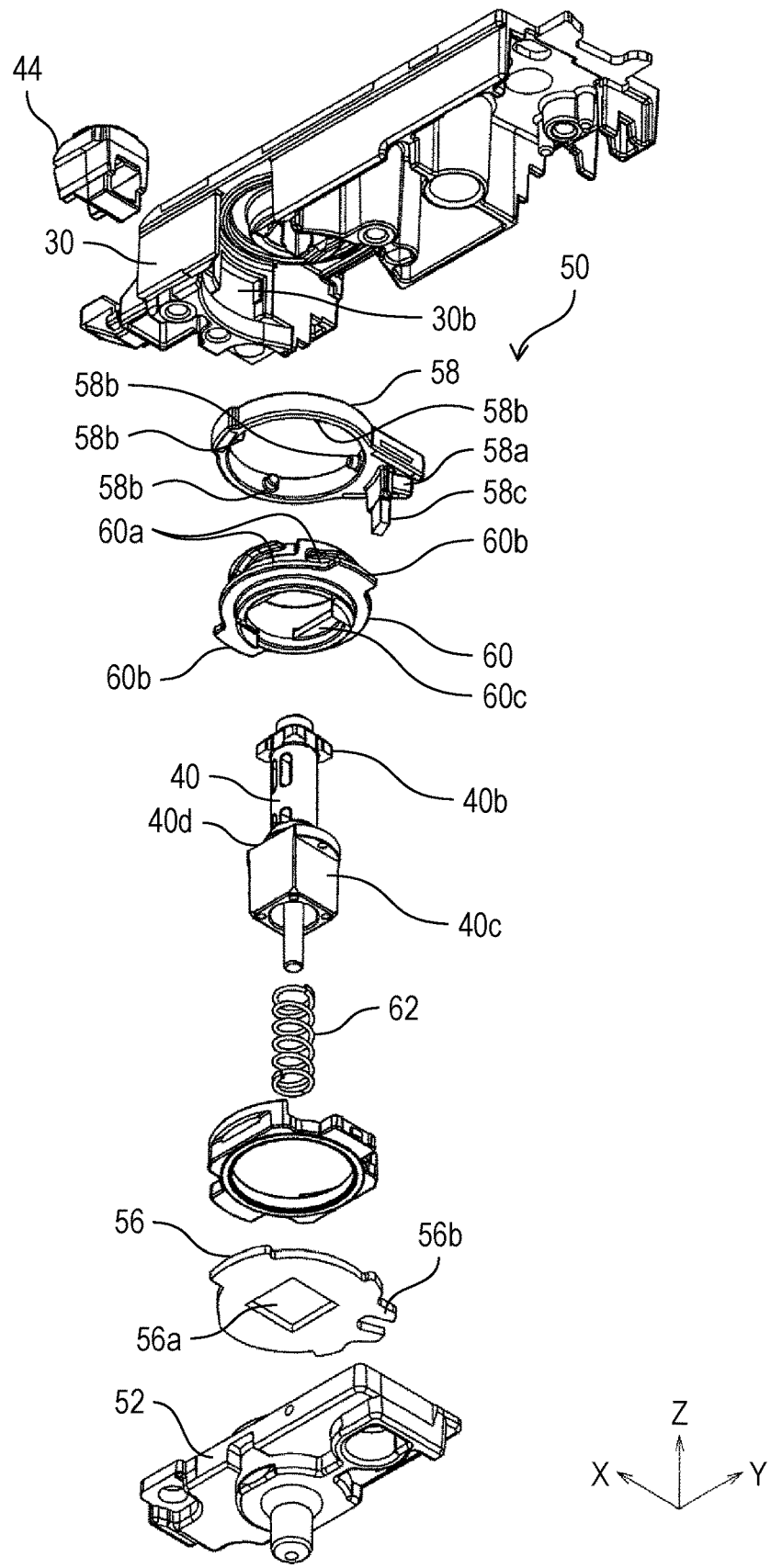
FIG. 9 is an exploded perspective view of the lock mechanism viewed from a different direction.

FIGS. 8A to 8C are exploded perspective views of the lock mechanism. FIG. 8A illustrates a lock mechanism corresponding to FIG. 7A, that is, in an unlocked state. In addition, FIG. 8B illustrates a lock mechanism corresponding to FIG. 7B, that is, in a half-locked state. Furthermore, FIG. 8C illustrates a lock mechanism corresponding to FIG. 7C, that is, in a locked state. FIG. 9 is an exploded perspective view of the lock mechanism as viewed from a different direction.

As illustrated in FIGS. 8A to 8C, a plurality of components constituting lock mechanism 50 are disposed between support members 30 and 32 and the base members 52 and 54. Base member 52 is fixed to support member 30, and base member 54 is attached to support member 32. Lock mechanism 50 includes, as the plurality of components, first rotating member 56, second rotating member 58, cam member 60, and spring 62 in addition to lock shaft 40 described above.

First rotating member 56 is rotatable about rotation center line C and holds lock shaft 40. Thus, first rotating member 56 includes through-hole 56a having a square shape, and lock shaft 40 includes shaft part 40c having a square cross section engaging with through-hole 56a. In addition, first rotating member 56 includes crank part 56b protruding in a direction orthogonal to rotation center line C.

Second rotating member 58 is a member that has an annular shape, that is rotatable about rotation center line C, and through which lock shaft 40 passes. In addition, second rotating member 58 includes crank part 58a protruding in a direction orthogonal to rotation center line C. Further, second rotating member 58 includes a plurality of cam followers 58b on an inner peripheral surface thereof. Second rotating member 58 includes claw part 58c that protrudes in an extending direction (Z-axis direction) of rotation center line C and engages with crank part 56b of first rotating member 56. Claw part 58c engages with crank part 56b of first rotating member 56, and thus, first rotating member 56 and second rotating member 58 rotate synchronously.

Figure 10:
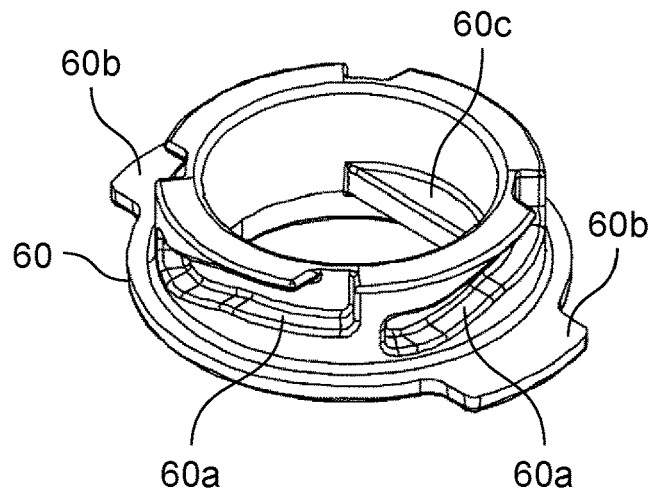
FIG. 10 is a perspective view of a cam member of the lock mechanism.

FIG. 10 is a perspective view of the cam member of the lock mechanism.

As illustrated in FIGS. 8A and 10, cam member 60 of lock mechanism 50 is a member that has a cylindrical shape and through which lock shaft 40 passes. Cam member 60 includes a plurality of cam grooves 60a that engage with the plurality of cam followers 58b of second rotating member 58 on an outer peripheral surface thereof. Cam groove 60a extends in the extending direction (Z-axis direction) of rotation center line C while extending in a circumferential direction. Further, cam member 60 includes rotation stopper part 60b that protrudes in a direction orthogonal to rotation center line C not to rotate about rotation center line C. As illustrated in FIG. 9, rotation stopper part 60b is provided on a back side of support member 30 (support member 32) and engages with guide groove 30b (guide groove of support member 32) extending in the extending direction of rotation center line C.

Such cam groove 60a is provided. Thus, when second rotating member 58 rotates about rotation center line C, cam member 60 is shifted in the extending direction of rotation center line C (Z-axis direction). Due to this shifting of cam member 60, hook part 40b of lock shaft 40 is shifted toward seating surfaces 30a and 32a of docking unit 26 in the extending direction of rotation center line C, as illustrated in FIGS. 7B and 7C. Thus, cam member 60 includes lever part 60c that comes into contact with the shoulder part 40d of lock shaft 40. Cam member 60 is shifted in a state where lever part 60c comes into contact with shoulder part 40d, and thus, lock shaft 40 is shifted.

Spring 62 biases lock shaft 40 in a direction in which hook part 40b of lock shaft 40 is separated from seating surfaces 30a and 32a of docking unit 26.

According to lock mechanism 50 having such a configuration, second rotating member 58 rotates, and thus, first rotating member 56 rotates to rotate lock shaft 40. Accordingly, cam member 60 is shifted to shift lock shaft 40. Accordingly, an operation of lock shaft 40 illustrated in FIGS. 7A to 7C is realized.

Second rotating member 58 of lock mechanism 50 is rotated by the user operating lock knob 28 (an example of a knob). Thus, docking unit 26 includes link mechanism 70.

As illustrated in FIG. 8A, link mechanism 70 includes, as components, slide member 72 that slides in the width direction (Y-axis direction) in addition to lock knob 28 described above.

Slide member 72 is provided in docking unit 26 to be slidable in the width direction (Y-axis direction). In addition, slide member 72 includes first slide plate 72a that has a thin plate shape and to which lock knob 28 is attached, second slide plate 72b having a thin plate shape and parallel to first slide plate 72a at an interval in the depth direction (X-axis direction), and connection plate 72c connecting these plates. At both ends of second slide plate 72b in the width direction, claw parts 72d protruding in the height direction (Z-axis direction) and engaging with crank part 58a of second rotating member 58 of lock mechanism 50 are provided. Accordingly, when the user moves lock knob 28 in the width direction, slide member 72 slides in the width direction, and thus, second rotating member 58 rotates. In addition, first rotating member 56 engaging with slide member 72 via second rotating member 58 also rotates in synchronization. Note that, the claw part engaging with crank part 56b of first rotating member 56 may be provided in the slide member 72, and slide member 72 may directly rotate first rotating member 56.

Link mechanism 70 operates lock mechanism 50 and also operates a connector holder shift mechanism.

Figure 11:
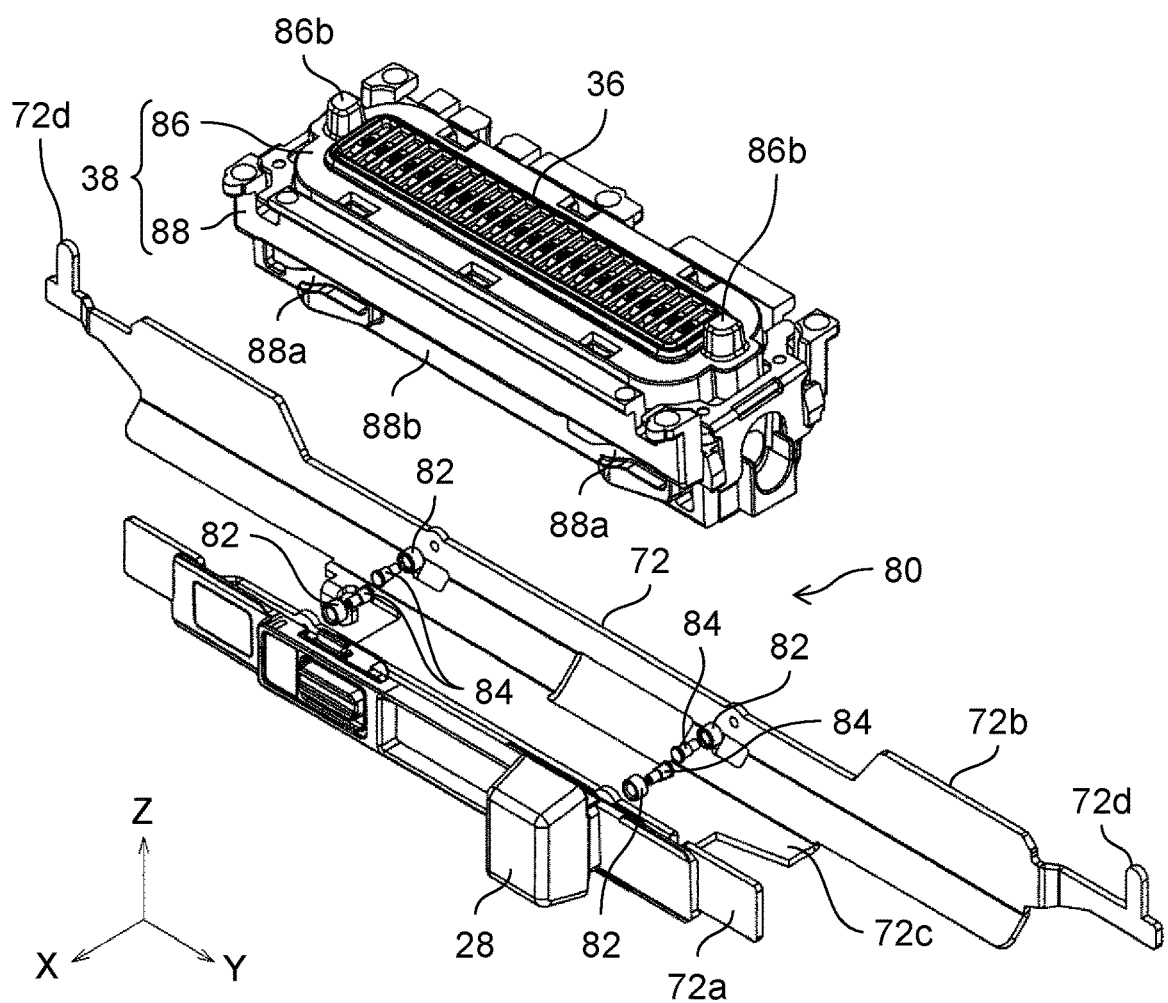
FIG. 11 is an exploded perspective view of a connector holder shift mechanism.
Figure 12:
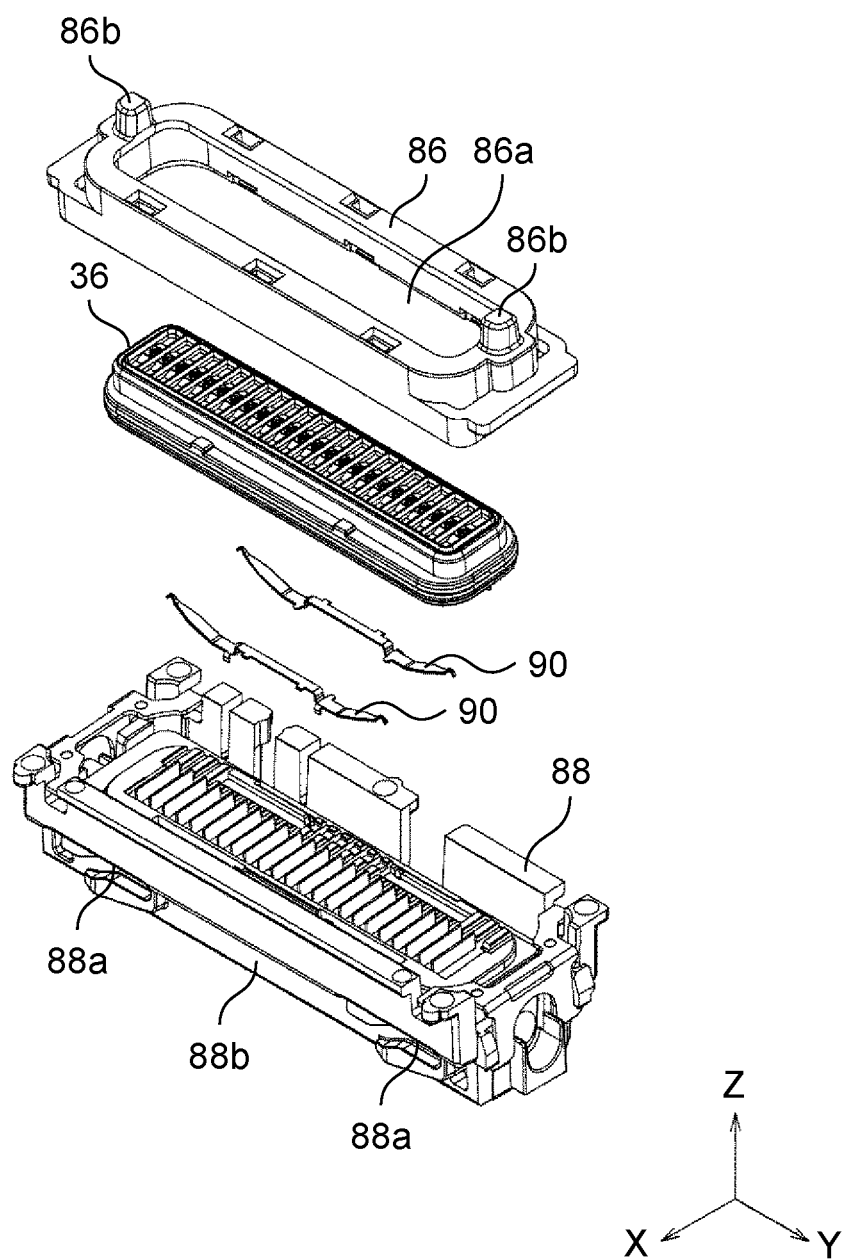
FIG. 12 is an exploded perspective view of a connector holder.

FIG. 11 is an exploded perspective view of the connector holder shift mechanism. In addition, FIG. 12 is an exploded perspective view of the connector holder.

As illustrated in FIG. 11, connector holder shift mechanism 80 is a mechanism for shifting connector holder 38 in the height direction (Z-axis direction), and includes a plurality of cam follower rollers 82 and cam grooves 88a formed in connector holder 38 and engaging with cam follower rollers 82.

The plurality of cam follower rollers 82 are attached to first and second slide plates 72a and 72b of slide member 72 via support pins 84 to be rotatable about the rotation center line extending in the depth direction (X-axis direction).

In the case of the present exemplary embodiment, connector holder 38 holds second connector 36 to be movable in the height direction (Z-axis direction). Connector holder 38 includes cover member 86 including connector accommodation hole 86a through which second connector 36 slides in the height direction, and housing member 88 that stores a board or the like electrically connected to second connector 36. The plurality of cam grooves 88a are formed on both side surfaces 88b of housing member 88 in the depth direction (X-axis direction).

Connector holder 38 is disposed between first slide plate 72a and second slide plate 72b of slide member 72. Accordingly, the plurality of cam follower rollers 82 attached to first and second slide plates 72a and 72b engage with cam grooves 88a of connector holder 38.

Figure 13A:
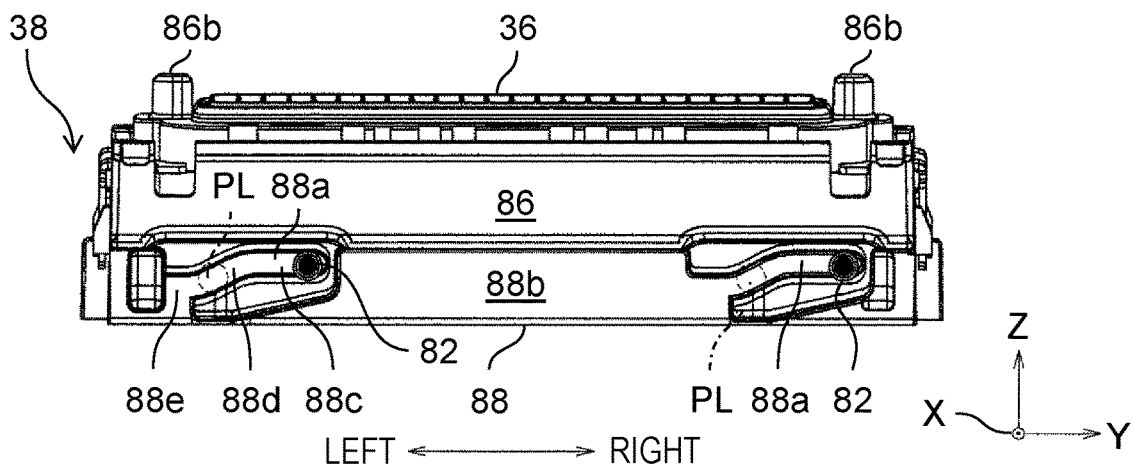
FIG. 13A is a diagram illustrating a position of a cam follower roller in the connector holder shift mechanism in the unlocked state corresponding to FIG. 7A.
Figure 13B:
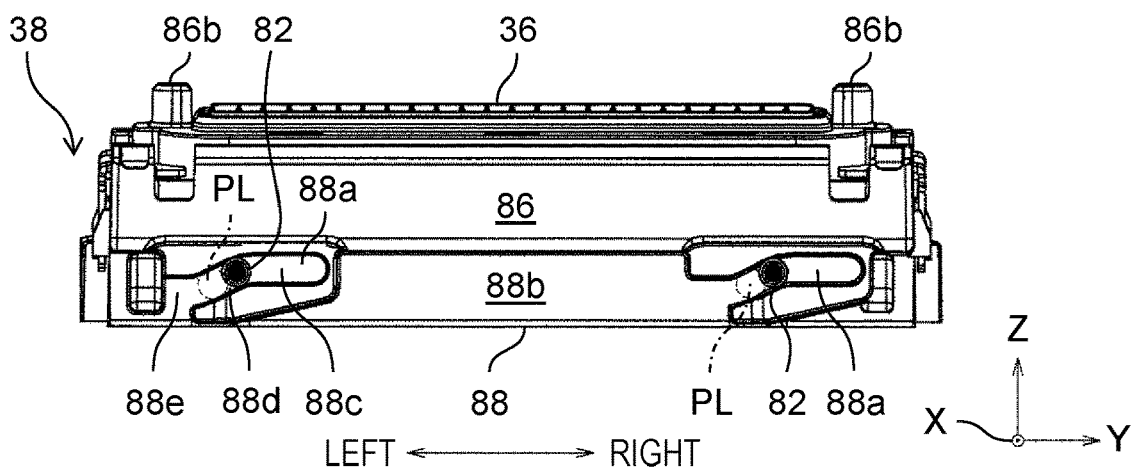
FIG. 13B is a diagram illustrating a position of the cam follower roller in the connector holder shift mechanism in the half-locked state corresponding to FIG. 7B.
Figure 13C:
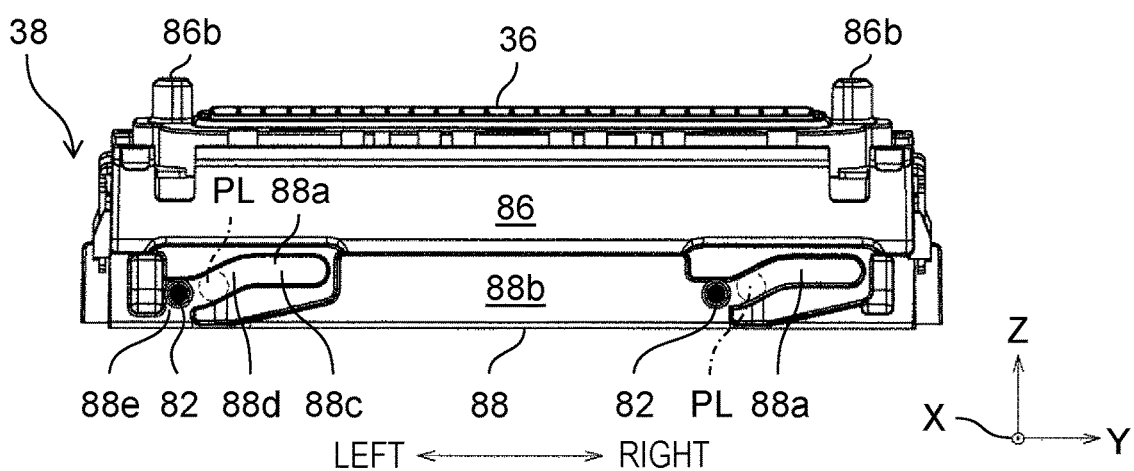
FIG. 13C is a diagram illustrating a position of the cam follower roller in the connector holder shift mechanism in the locked state corresponding to FIG. 7C.

FIG. 13A is a diagram illustrating a position of the cam follower roller in the connector holder shift mechanism in the unlocked state corresponding to FIG. 7A. In addition, FIG. 13B is a diagram illustrating a position of the cam follower roller in the connector holder shift mechanism in the half-locked state corresponding to FIG. 7B. FIG. 13C is a diagram illustrating a position of the cam follower roller in the connector holder shift mechanism in the locked state corresponding to FIG. 7C.

As illustrated in FIGS. 13A to 13C, when slide member 72 slides in the width direction (Y-axis direction), the plurality of cam follower rollers 82 rotate in cam groove 88a and move in the width direction. Accordingly, connector holder 38 is shifted in the height direction (Z-axis direction). That is, cam groove 88a is configured such that connector holder 38 is shifted in the height direction by the movement of cam follower roller 82 in the width direction. Specifically, cam groove 88a includes first horizontal groove 88c extending in the width direction, inclined groove 88d connected to a left end of first horizontal groove 88c and inclined in a direction separated from tablet terminal 12 (downward in the drawing), and second horizontal groove 88e connected to a left end of inclined groove 88d and extending in the width direction.

Link operations of lock mechanism 50, link mechanism 70, and connector holder shift mechanism 80 will be described below. First, the user attaches tablet terminal 12 to socket 24. Accordingly, as illustrated in FIG. 7A, lock shaft 40 passes through through-hole 42a of annular member 42.

In this state, when the user moves lock knob 28 from an unlock position (rightmost position) to a left side, that is, when slide member 72 slides to the left side, cam follower roller 82 moves in first horizontal groove 88c of cam groove 88a as illustrated in FIG. 13A. While cam follower roller 82 moves in first horizontal groove 88c, connector holder 38 does not move in the height direction (Z-axis direction).

When the user further moves lock knob 28 to the left side, cam follower roller 82 enters inclined groove 88d from first horizontal groove 88c and moves in inclined groove 88d. Accordingly, connector holder 38 is shifted toward tablet terminal 12.

When the user further moves lock knob 28 to the left side, cam follower roller 82 reaches lock completion position PL. A timing at which cam follower roller 82 reaches lock completion position PL is a timing at which hook part 40b of lock shaft 40 is caught by annular member 42 as illustrated in FIG. 7C. That is, the rotation and shift of lock shaft 40 illustrated in FIGS. 7A to 7C are completed while the user moves lock knob 28 from the unlock position (rightmost position) to the left side and cam follower roller 82 reaches lock completion position PL. Accordingly, this timing is timing at which tablet terminal 12 is completely fixed to socket 24 (that is, docking unit 26). Cam groove 60a of cam member 60 of lock mechanism 50 has a shape that realizes this timing.

When the user further moves lock knob 28 to the left side, cam follower roller 82 moves in inclined groove 88d from lock completion position PL toward the second horizontal groove 88e. Immediately before cam follower roller 82 enters second horizontal groove 88e, second connector 36 held by connector holder 38 comes into contact with first connector 34 of tablet terminal 12. When the user moves lock knob 28 to the left side, cam follower roller 82 moves into second horizontal groove 88e, and the shift of connector holder 38 is ended. Accordingly, the electrical connection between first connector 34 and second connector 36 is completed. Then, lock knob 28 reaches a lock position (leftmost position).

Note that, in the case of the present exemplary embodiment, as illustrated in FIG. 12, in order to prevent second connector 36 from coming into contact with first connector 34 with an excessive contact pressure, elastic member 90 that supports second connector 36 is provided in connector holder 38 in a contact direction (height direction (Z-axis direction)) between first connector 34 and second connector 36. Elastic member 90 is, for example, a leaf spring. Such elastic member 90 is elastically deformed, and thus, first connector 34 and second connector 36 are prevented from coming into contact with each other with the excessive contact pressure and being damaged. Note that, alternatively, an elastic member that supports first connector 34 in the contact direction may be provided in tablet terminal 12.

In addition, as illustrated in FIG. 11, a plurality of guide pins 86b protruding in the height direction are provided in cover member 86 of connector holder 38 such that connector holder 38 moves only in the height direction (Z-axis direction) with respect to the movement of cam follower roller 82 in the width direction (Y-axis direction). In contrast, as illustrated in FIGS. 4 to 5, guide holes 34a that engage with the plurality of guide pins 86b are provided in first connector 34 of tablet terminal 12.

When the user moves lock knob 28 from the lock position (leftmost position) to a right side, cam follower roller 82 moves from second horizontal groove 88e toward inclined groove 88d. When cam follower roller 82 enters inclined groove 88d, connector holder 38 starts to be shifted in the direction separated from tablet terminal 12. As a result, the contact between first connector 34 and second connector 36 is released, and the electrical connection is released.

When the user further moves lock knob 28 to the right side, cam follower roller 82 passes through lock completion position PL. At the same time, hook part 40b of lock shaft 40 starts to be separated from annular member 42.

When the user further moves lock knob 28 to the right side, cam follower roller 82 enters first horizontal groove 88c from inclined groove 88d. Then, lock knob 28 reaches the unlock position (rightmost position), and as illustrated in FIG. 7A, lock shaft 40 enters a state where hook part 40b can pass through through-hole 42a of annular member 42.

According to the present exemplary embodiment described above, in detachable PC 10 including tablet terminal 12 and keyboard unit 14 that are detachably attached to each other, in a state where tablet terminal 12 is completely fixed to keyboard unit 14, electrical connection between tablet terminal 12 and keyboard unit 14 can be established.

Specifically, first connector 34 of tablet terminal 12 and second connector 36 of docking unit 26 are electrically connected after tablet terminal 12 is completely fixed to socket 24 of keyboard unit 14 (docking unit 26 therein) by link mechanism 70. In addition, after the electrical connection between first connector 34 and second connector 36 is released by link mechanism 70, the fixation of tablet terminal 12 to keyboard unit 14 is released.

Although the present disclosure has been described above by taking the above exemplary embodiment as an example, the present disclosure is not limited to the above exemplary embodiment.

For example, in the case of the above exemplary embodiment, as illustrated in FIGS. 7A to 7C, in lock mechanism 50, tablet terminal 12 is fixed to socket 24 of keyboard unit 14 (docking unit 26 therein) via lock shaft 40 including hook part 40b. However, in the exemplary embodiment of the present disclosure, the fixing of tablet terminal 12 to keyboard unit 14 is not limited thereto. The content of an operation of locking the lock mechanism is not limited as long as first connector 34 of tablet terminal 12 and second connector 36 of docking unit 26 are linked via the link mechanism.

Further, the above exemplary embodiment is detachable PC 10 including tablet terminal 12 and keyboard unit 14 that are detachably attached to each other, but the exemplary embodiment of the present disclosure is not limited thereto.

That is, in a broad sense, an exemplary embodiment of the present disclosure is, an electronic device includes a first unit and a second unit that are detachably attached to each other. The electronic device includes a first connector that is provided in the first unit, a socket that is provided in the second unit, the first unit being attached and detached to the socket in a first direction, a lock mechanism that fixes the first unit to the socket, a second connector that is provided in the socket, the second connector coming into contact with the first connector in the first direction to be electrically connected, a connector holder that is provided in the socket to be shiftable in the first direction, the connector holder maintaining the second connector, a connector holder shift mechanism that shifts the connector holder in the first direction, and a link mechanism that mechanically links the lock mechanism and the connector holder shift mechanism, the second connector coming into contact with the first connector after the fixing of the first unit to the socket is completed, and the second connector is separated from the first connector before the fixing of the first unit to the socket is released.

As described above, the exemplary embodiments have been described as examples of the technique according to the present disclosure. Thus, the accompanying drawings and the detailed description have been provided. Accordingly, in order to illustrate the above technique, the components described in the accompanying drawings and the detailed description may include not only components that are essential for solving the problem but also components that are not essential for solving the problem. For this reason, it should not be immediately construed that those non-essential components are essential only based on the fact that those non-essential components are illustrated in the accompanying drawings or described in the detailed description.

In addition, since the above-described exemplary embodiments are intended to exemplify the technique according to the present disclosure, various modifications, replacements, additions, and omissions can be made within the scope of the appended claims or of their equivalents.

The present disclosure is applicable to an electronic device in which a first unit and a second unit that are detachable from each other are electrically connected.

What is claimed is:

1. An electronic device including a first unit and a second unit that are detachably attached to each other, the electronic device comprising:
   a first connector that is provided in the first unit;
   a socket that is provided in the second unit, the first unit being attached to and detached from the socket in a first direction;
   a lock mechanism that fixes the first unit to the socket;
   a second connector that is provided in the socket, the second connector coming into contact with the first connector in the first direction to be electrically connected;
   a connector holder that is provided in the socket to be shiftable in the first direction, the connector holder maintaining the second connector;
   a connector holder shift mechanism that shifts the connector holder in the first direction;
   a link mechanism that mechanically links the lock mechanism and the connector holder shift mechanism, the second connector coming into contact with the first connector when the fixing of the first unit to the socket is completed, and the second connector being separated from the first connector when the fixing of the first unit to the socket is released; and
   an elastic member that biases the second connector in a direction from the second connector to the first connector,
   wherein
   the link mechanism includes:
      a slide member that slides in a second direction orthogonal to the first direction, and a knob that is provided in the slide member,
the connector holder shift mechanism includes:
   a cam follower roller that is provided in the slide member, and
   a cam groove that is disposed in the connector holder to engage with the cam follower roller, and
the cam groove shifts the connector holder in the first direction by the sliding of the slide member in the second direction via the cam follower roller;
wherein
   the lock mechanism includes a lock shaft that rotates about a rotation center line extending in the first direction and is shifted in the first direction by sliding of the slide member of the link mechanism,
   the lock shaft includes a hook part having a non-circular shape as viewed in the first direction, and
   the first unit includes an annular member having an annular shape that includes a through-hole having a non-circular shape as viewed in the first direction, the hook part being configured to pass through the through-hole, and the hook part of the lock shaft in a state of being rotated at a predetermined rotation angle being caught on the annular member.

2. The electronic device according to claim 1, wherein the lock mechanism includes
   a first rotating member holding the lock shaft, being rotatable about the rotation center line, and including a crank part connected to the slide member,
   a second rotating member having an annular shape, being rotatable about the rotation center line, including a cam follower on an inner peripheral surface, and including a crank part coupled to the slide member, and
   a cam member having a cylindrical shape, being movable in the first direction, including a cam groove extending in the first direction while extending in a circumferential direction on an outer peripheral surface and engaging with the cam follower, and shifting the lock shaft in the first direction.

3. The electronic device according to claim 1, wherein
the second connector is provided in the connector holder to be movable in the first direction, and
the elastic member is provided in the connector holder.

4. The electronic device according to claim 1, wherein
the first unit is a tablet terminal including a touch screen, and
the second unit is a keyboard unit including a keyboard.

* * * * *